United States Patent [19]

Shimizu et al.

[11] Patent Number: 4,933,415
[45] Date of Patent: Jun. 12, 1990

[54] POLYETHER END-BLOCKED WITH HYDROLYZABLE SILYL GROUPS, METHOD OF MANUFACTURING AND ROOM TEMPERATURE CURABLE COMPOSITION USING THE POLYETHER

[75] Inventors: Chiyuki Shimizu; Tamio Yoshida, both of Ohta, Japan

[73] Assignee: Toshiba Silicone Co., Ltd., Japan

[21] Appl. No.: 236,826

[22] Filed: Aug. 26, 1988

Related U.S. Application Data

[62] Division of Ser. No. 53,247, May 22, 1987, Pat. No. 4,786,667.

[30] Foreign Application Priority Data

May 30, 1986 [JP] Japan .................. 61-124857
May 30, 1986 [JP] Japan .................. 61-124858

[51] Int. Cl.$^5$ .................................. C08G 77/04
[52] U.S. Cl. .................... 528/27; 524/858;
525/403; 525/409; 525/523; 528/28; 528/407; 556/423
[58] Field of Search ............. 528/27, 28, 407; 525/403, 409, 523; 556/423; 524/858

[56] References Cited

U.S. PATENT DOCUMENTS 3,247,280  4/1966  Kanner .................. 525/523
4,116,900  9/1978  Belanger .............. 525/523

FOREIGN PATENT DOCUMENTS 0129098 10/1979 Japan ................... 528/27
0129099 10/1979 Japan ................... 528/27

Primary Examiner—Wilbert J. Briggs, Sr.

[57] ABSTRACT

There are provided polyethers end-blocked with hydrolyzable silyl groups which have molecular weight from 500 to 50,000 and are represented by the formula:

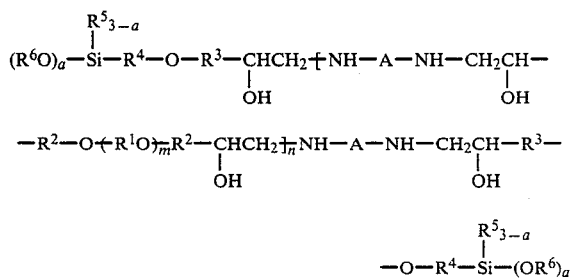

where $R^1$, $R^2$, $R^3$ and $R^4$ individually represent a divalent hydrocarbon group, $R^5$ represents a monovalent hydrocarbon group, $R^6$ represents an alkyl group with 1 to 6 carbon atoms, A represents a substituted or non-substituted divalent aromatic group, a represents a number of 1 to 3, m represents a number of 10 to 500 and n represents a number of 1 or greater. The polyether is produced by reacting an epoxy end-blocked polyoxyalkylene, a mono-epoxy substituted hydrolyzable silane, and an aromatic diamine.

7 Claims, 1 Drawing Sheet

POLYETHER END-BLOCKED WITH HYDROLYZABLE SILYL GROUPS, METHOD OF MANUFACTURING AND ROOM TEMPERATURE CURABLE COMPOSITION USING THE POLYETHER

This application is a division of application Ser. No. 053,247, filed May 22, 1987, now U.S. Pat. No. 4,786,667.

The present application claims the priority of Japanese Patent Applications Ser. No. 61-124857 and No. 61-124858 both filed on May 30, 1986.

BACKGROUND OF THE INVENTION

This invention concerns a polyether end-blocked with hydrolyzable silyl groups that can be cured at room temperature into a rubber-like elastomer upon contact with moisture, and a method of manufacturing the same. This invention also relates to a room temperature curing composition comprising such a polyether as an ingredient. The room temperature curing composition cures to a rubbery elastomer particularly excellent in heat resistance and weather resistance, and having good adhesive property before cure with no residual tackiness on the surface after cure.

The room temperature curing composition of this invention, comprising the above polyether, is suitable for use as a sealant. Similar polyethers are known (Japanese Patent Publication Kokai No. 50-156599, etc.) as is their use in sealants. Sealants based on this polymer have been employed for the joints of buildings or joining portions in transportation machines (Japanese Patent Publication Kokai No. 52-73998, etc). However, since the prior art polymers of this type are poor in heat resistance and weather resistance, they involve a problem of being unsuitable for use in the joints of building outer walls requiring weather resistance, or in joints exposed to a relatively high temperature, for example, certain joining portions in transportation machines.

Since the polymers of this type have no substantial adhesive property, it is required to apply the sealant after primer treatment of the surface to be bonded. Further, since the surface of cured sealant remains tacky, there is a problem that dust or the like is liable to be stuck to the sealant.

This invention is for overcoming these problems and the object thereof is to provide a room temperature curing composition capable of curing to a rubbery elastomer excellent in heat resistance and weather resistance, and having good adhesive property before cure with no residual tackiness on the surface after cure. This invention further provides a polyether end-blocked with hydrolyzable silyl groups which is useful as a base polymer in sealants, as well as a process for producing such a polyether.

Figure 1:
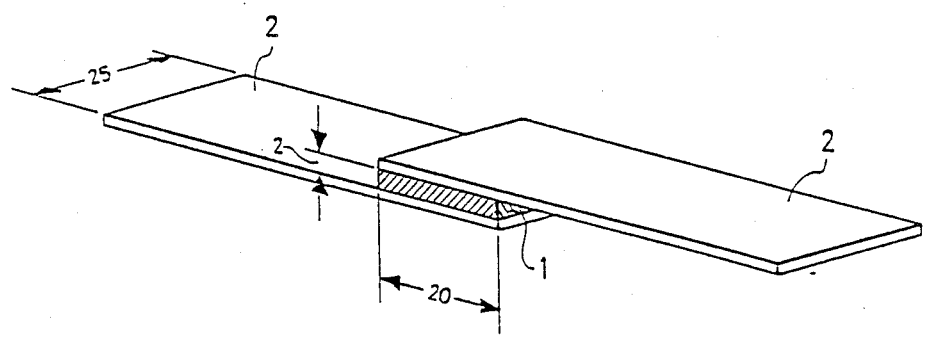
FIG. 1 is a perspective view of a specimen used for the shear resistance test. All of the units for values in the drawing are expressed in millimeters.

1 ... sample
2 ... adherend (glass, aluminum or polyvinyl chloride-coated steel plate)

DETAILED DESCRIPTION OF THE INVENTION

This invention concerns a polyether having a molecular weight from 500 to 50,000 and end-blocked with hydrolyzable silyl groups represented by the general formula:

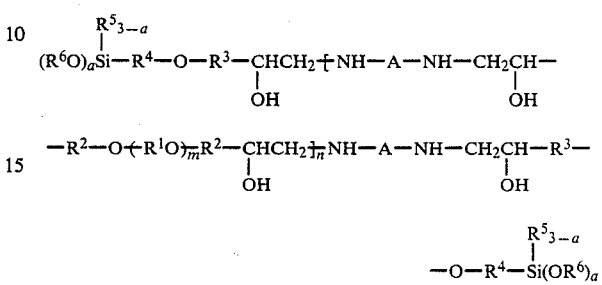

where $R^1$, $R^2$, $R^3$ and $R^4$ individually represent a divalent hydrocarbon group, $R^5$ represents a monovalent hydrocarbon group, $R^6$ represents an alkyl group with 1 to 6 carbon atoms, A represents a substituted or non-substituted divalent aromatic group, a represents a number from 1 to 3, m represents a number from 10 to 500 and n represent a number of 1 or greater.

This invention also relates to a process for producing a polyether having a molecular weight from 500 to 50,000 and end-blocked with hydrolyzable silyl groups, by reacting:

(A) a polyoxyalkylene end-blocked with epoxy groups represented by the general formula:

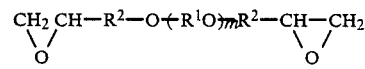

where $R^1$ and $R^2$ individually represent a divalent hydrocarbon group and m represents a number from 10 to 500, (B) an aromatic diamine compound represented by the general formula:

where A represents a substituted or non-substituted divalent aromatic group, and (C) an organo silicon compound having an epoxy group and hydrolyzable groups represented by the general formula:

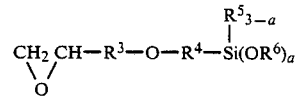

where $R^3$ and $R^4$ individually represent a divalent hydrocarbon group, $R^5$ represents a monovalent hydrocarbon group, $R^6$ represents an alkyl group with 1 to 6 carbon atoms and a represents a number of 1 to 3.

This invention further concerns a room temperature curable composition comprising:

(I) 100 parts by weight of a polyether having molecular weight from 500 to 50,000, end-blocked with hydrolyzable silyl groups and represented by the general formula:

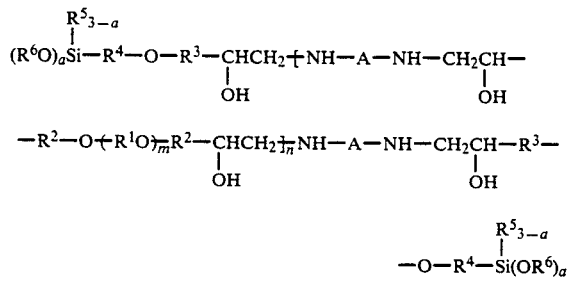

where $R^1$, $R^2$, $R^3$ and $R^4$ individually represent a divalent hydrocarbon group, $R^5$ represents a monovalent hydrocarbon group, $R^6$ represents an alkyl group with 1 to 6 carbon atoms, A represents a substituted or non-substituted divalent aromatic group, a represents a number from 1 to 3, m represents a number from 10 to 500 and n represents a number of 1 or greater, (II) 3 to 300 parts by weight of inorganic filler and
(III) 0.001 to 20 parts by weight of a curing catalyst.

The polyether according to this invention is represented by the general formula:

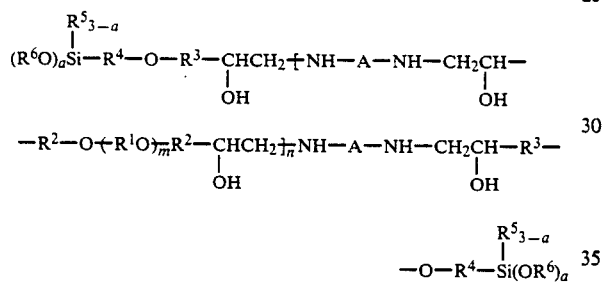

where $R^1$, $R^2$, $R^3$, $R^4$, $R^5$, $R^6$, A, a, m and n respectively have the same meanings as described above. The oxyalkylene unit represented by $R^1O$ is preferably an oxyethylene unit, oxypropylene unit or a combined system of oxyethylene unit and oxypropylene unit. Oxypropylene unit is particularly preferred since the raw material is easily available, polymerization can be conducted easily and a liquid-state can be maintained readily even at a high degree of polymerization. The polymerization degree m for the oxyalkylene unit is selected from a range of 10 to 500. If m is less than 10, it is difficult to obtain a polyether capable of providing a rubber-like cured product having sufficient elongation or a polyether having a viscosity suitable for a practical processability level. On the other hand, if m is greater than 500, the heat resistance and the weather resistance of the elastomer obtained from the room temperature curable composition of this invention is poor.

As divalent hydrocarbon group $R^2$, there can be mentioned, for example, methylene group, ethylene group, trimethylene group, tetramethylene group, phenylene group, cyclohexylene group and the group represented by

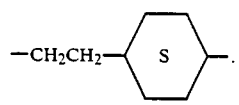

Among them, methylene group is preferred in view of the availability of the raw material. As $R^3$ and $R^4$ those divalent hydrocarbon groups mentioned for $R^2$ can be exemplified. $R^3$ is preferably methylene group in view of the availability of the raw material. Further, $R^4$ is preferably trimethylene group or tetramethylene group, particularly, trimethylene group in view of the ease of synthesis and the availability of the raw material.

The monovalent hydrocarbon group $R^5$ can be selected from alkyl group such as methyl group, ethyl group and propyl group; aryl group such as phenyl group; aralkyl group such as 3-phenylethyl group, β-phenylpropyl group and the like. Methyl or phenyl group is preferred and methyl group is particularly preferred in view of the ease of synthesis and availability of the raw material. $R^6$ is selected from an alkyl group with 1 to 6 carbon atoms. Methyl group or ethyl group is preferred and methyl group is particularly preferred since the hydrolyzability of the alkoxy group represented by $R^6O$ bonded to the silicon atom is high. The number a for the hydrolyzable groups is selected from the range of 1 to 3 and a is preferably 2 in order to obtain a suitable polyether as the base polymer for the composition providing a rubber-like cured product with high elongation.

A is a substituted or non-substituted divalent aromatic group. Phenylene group, bisphenylene group or a group represent by the general formula: —$R^7$—Q—$R^8$— (where $R^7$, $R^8$ and Q are as described above) are preferred in view of the availability of the raw material, compatibility with other raw materials, as well as enhanced workability in the room temperature curing composition and enhanced elongation in the cured elastomer.

Specific examples of A are, for example,

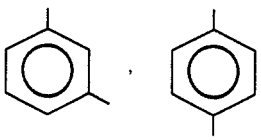

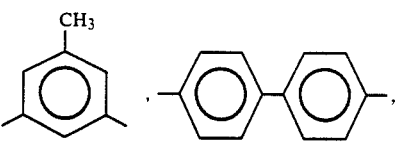

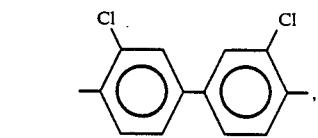

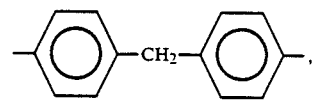

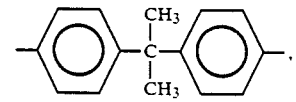

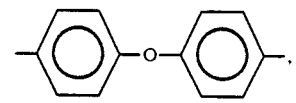

-continued

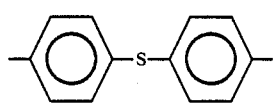

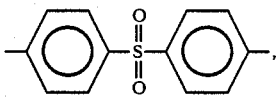

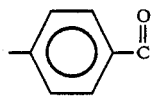

Further, n is a number of 1 or greater and it should be selected so as to provide the molecular weight of the polyether according to this invention being from 500 to 50,000. When the polyether of this invention is used as a base polymer for a sealant and the molecular weight is lower than 500, the elongation of the cured elastomer is insufficient. While on the other hand, if the molecular weight is greater than 50,000, the viscosity of the base polymer is increased and the workability of the uncured sealant is reduced.

The polyether of this invention can be synthesized, for example, by reacting:

(A) a polyoxyalkylene end-blocked with epoxy groups represented by the general formula:

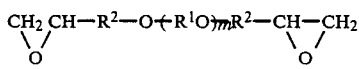

where $R^1$, $R^2$ and m respectively have the same meaning as described above, (B) an aromatic diamine compound represented by the general formula:

where A has the same meaning as described above, and (C) an organo silicon compound having an epoxy group and hydrolyzable groups represented by the general formula:

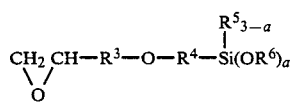

where $R^3$, $R^4$, $R^5$, $R^6$ and a respectively have the same meaning as described above.

Typical examples of component (A) include those prepared by reacting epichlorohydrin to a polyoxyethylene or olyoxypropylene end-blocked with hydroxyl groups under the presence of a basic catalyst or the like.

Specific examples of component (B) are, for example,

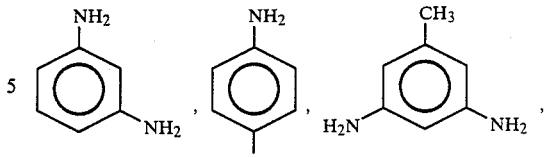

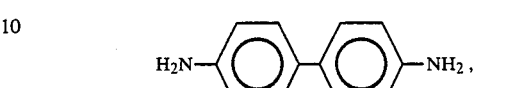

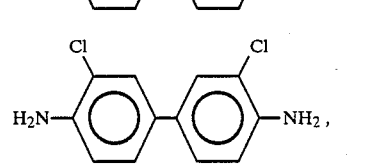

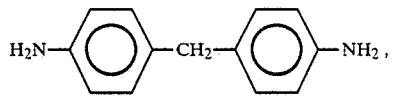

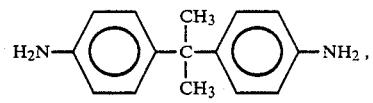

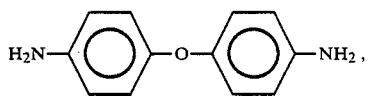

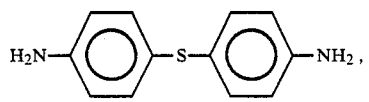

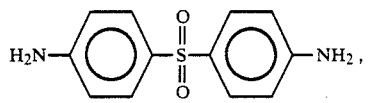

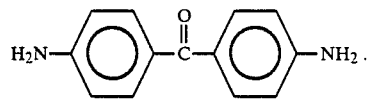

Specific examples of component (C) are, for example,
γ-glycidoxypropyltrimethoxysilane,
γ-glycidoxybutyltrimethoxysilane,
γ-glycidoxypropyltriethoxysilane,
γ-glycidoxybutyltriethoxysilane,
methyl(γ-glycidoxypropyl)dimethoxysilane,
methyl(γ-glycidoxybutyl)dimethoxysilane,
methyl(γ-glycidoxypropyl)diethoxysilane,
methyl(γ-glycidoxybutyl)diethoxysilane,
phenyl(γ-glycidoxypropyl)dimethoxysilane,
phenyl(γ-glycidoxybutyl)dime
dimethyl(γ-glycidoxypropyl)methoxysilane and
dimethyl(γ-glycidoxybutyl)methoxysilane.

The polyether according to this invention can be obtained through the reaction of the epoxy groups in component (A) and (C) with the amino groups in component (B) as has been described above.

The reaction of components (A), (B) and (C) is preferably carried out at a temperature higher than the ambient temperature, for example, under the condition from 50° to 150° C. In this case, it is preferred to use such a compound as methanol, ethanol, phenol, salicylic acid or tris(dimethylaminomethyl)phenol as a reaction promotor. Methanol is a preferred example. Although the reaction can be carried out without solvent, hydrocarbon, ether, ester or other solvent may be used.

The blending ratio of components (A), (B) and (C) is theoretically (A):(B):(C)=n:(n+1):2 on a molar basis. However, components (B) and (C) may be used in a slight excess over the theoretical amount.

Components (A), (B) and (C) may be added simultaneously for reaction, but it is preferred to conduct the chain extension first by reacting component (A) with component (B). As stated above, the amount of component (B) is in slight excess to component (A) on a molar basis to obtain the polyether within the desired molecular weight range. Then, the required or slightly excessive amount of component (C) is added and reacted. By this procedure the polymerization degree is easily controlled and the hydrolyzable groups can surely be introduced to the ends of the molecular chain.

The ingredient (II) in the room temperature curable composition of this invention is to give the composition an appropriate non-flowing property and reinforcing property. The ingredient (II) may be exemplified by fumed silica, precipitated silica, pulverized silica, diatomaceous earth, calcium carbonate, titanium oxide, alumina, aluminum hydroxide, iron oxide, talc and clay. The amount of ingredient (II) used is within a range from 3 to 300 parts by weight and, preferably, from 5 to 200 parts by weight based on 100 parts by weight of ingredient (I). If the amount of ingredient (II) is less than 3 parts by weight, neither non-flowing property nor reinforcing property can be obtained. On the other hand, if it is greater than 300 parts by weight, the viscosity of the composition is increased and lowers the workability.

The curing catalysts as ingredient (III) used in this invention may be exemplified by tin carboxylates such as tin octylate; organo tin carboxylates such as dibutyl tin dilaurate, dibutyl tin dimaleate and dibutyl tin phthalate; organo tin oxides and reaction products thereof with esters; titanium alkoxides such as tetrabutyl titanate; amines; amine salts; quarternary ammonium salts; guanidine compounds or the likes. The curing catalyst is preferably used within a range from 0.001 to 20 parts by weight based on 100 parts by weight of ingredient (I). If the amount of ingredient (III) is below the above specified range, the curing rate is too slow making them not suitable for use. While on the other hand, an excessive amount has no accelerating effect and results in the risk of bleeding or deposition.

Since the composition of this invention has adhesive property by itself, there is no requirement for using silane coupling agents ordinarily employed for providing the adhesive property. It is, however, possible to use such agents for enhancing the bonding property, or to add hydrolyzable silanes to the composition with an aim of enabling the composition to store in one package style with good shelf-life. The hydrolyzable silanes may be exemplified by $H_2N(CH_2)_3Si(OCH_3)_3$, $HN(CH_2)_3Si(OCH_2CH_3)_3$, $H_2N(CH_2)_3NH(CH_2)_3Si(OCH_3)_3$, -continued

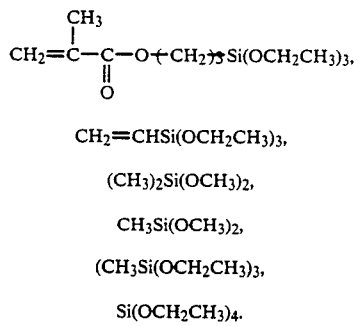

$CH_2=CHSi(OCH_2CH_3)_3$, $(CH_3)_2Si(OCH_3)_2$, $CH_3Si(OCH_3)_2$, $(CH_3Si(OCH_2CH_3)_3$, $Si(OCH_2CH_3)_4$.

For obtaining good shelf-life in one package style, addition of monovalent primary alcohols such as methanol or ethanol is also effective.

Further, it is possible to add agents which give the composition thixotropy such as hydrogenated castor oil or to add a plasticizer such as dioctylphthalate, butylbenzyl phthalate and chlorinated paraffin.

The composition of this invention can be used as a onepackage type as described above, as well as a twopackage type in which a portion comprising the ingredients (I) and (II), and a portion comprising the ingredient (III) are stored separately and mixed before use.

The composition of this invention has an adhesive property before curing, and the elastomer obtained after curing is excellent in heat resistance and weather resistance. Further the cured elastomer has no residual surface tackiness, and no soiling occurs due to the deposition of dust. Thus the composition is suitable for use as a sealant requiring weather resistance such as for joints of building outer walls, or joining parts of transportation machines, etc. exposed to relatively high temperature.

EXAMPLES OF THE INVENTION

This invention will now be described more specifically by way of examples, in which all parts are parts by weight and "%" means "% by weight".

Example 1

To 10 epoxy gram equivalent of polyoxypropylene end-blocked with glycidyl groups having an average polymerization degree of 15, molecular weight of about 1000 and viscosity at 25° C. of 270 cSt, were added in a reactor 6 moles of

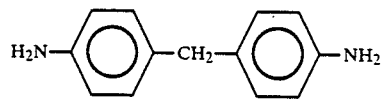

and 10% to the polyoxypropylene of methanol. The reaction was started by stirring and heating at 60° C. in a nitrogen atmosphere. The reactor content was sampled at 4 hour intervals for conducting a quantitative determination of the total amount of epoxy groups and primary amines in the specimen by using potentiometric titration, for NMR observation of the peak of epoxide methylene (2.67 ppm based on tetramethyl silane) and for measurement of the viscosity at 25° C. After 16 hours from the start of stirring under heating, nearly theoretical amounts of epoxy groups and primary amines were consumed and, at the same time, the proton peak of the epoxide methylene disappeared. Further the viscosity which had been 100 cSt before starting the stirring under heating reached 1,800° cSt. Subsequently, 2.2 moles of

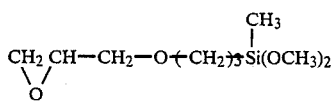

were added and heating with stirring was continued under the same conditions. The reactor content was again sampled at 4 hour intervals after adding the silane and the total amount of epoxy groups and primary amines in the specimen was quantitatively determined by using potentiometric titration. Additionally, the proton peak of the epoxide methylene was observed by NMR. Both the epoxy groups and the primary amines were substantially consumed 12 hours after the addition of silane. The reaction was stopped and methanol was stripped off. The product was a pale yellow viscous liquid polyether having a viscosity at 25° C. of 19,000 cSt, specific gravity at that temperature of 1.01 and a number average molecular weight measured by GPC of 6,500. This polyether, P-1, is end-blocked with hydrolyzable silyl groups and represented by the following formula.

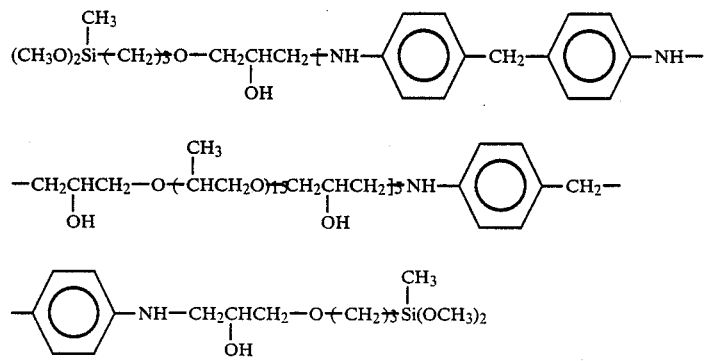

Example 2

To 10 epoxy gram equivalent of polyoxypropylene end-blocked with glycidyl groups having an average polymerization degree of 32, molecular weight of about 2000 and viscosity at 25° C. of 550 cSt, were added in a reactor 6 moles of

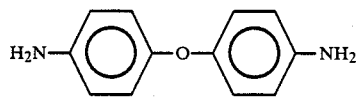

and 10% to the polyoxypropylene of methanol. The reaction was started by stirring and heating at 60° C. in a nitrogen atmosphere. The reactor content was sampled at 4 hour intervals for conducting a quantitative determination of the total amount of epoxy groups and primary amines in the specimen by using potentiometric titration, for NMR observation of the peak of epoxide methylene and for measurement of the viscosity at 25° C. After 16 hours from the start of stirring under heating, nearly theoretical amounts of epoxy groups and primary amines were consumed and, at the same time, the proton peak of the epoxide methylene disappeared. Further, the viscosity which had been 250 cSt before starting the stirring under heating reached 4,200 cSt. Subsequently, 2.2 moles of

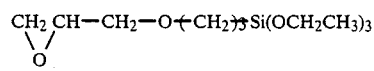

were added and heating with stirring was continued under the same conditions. The reactor content was again sampled at 4 hour intervals after adding the silane, and the total amount of epoxy groups and primary amines in the specimen was quantitatively determined by using the potentiometric titration. Additionally, the proton peak of the epoxide methylene was observed by NMR. Both the epoxy groups and the primary amines were substantially consumed 12 hours after the addition of silane. The reaction was stopped and methanol was stripped off. The product was a pale yellow viscous liquid polyether having a viscosity at 25° C. of 1,000 cSt, specific gravity at that temperature of 1.01 and a number average molecular weight measured by GPC of 11,000. This polyether, P-2, is end-blocked with hydrolyzable silyl groups and represented by the following formula.

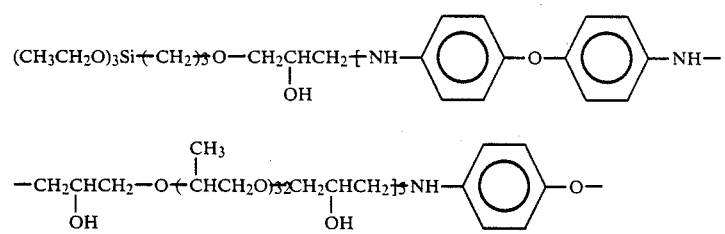

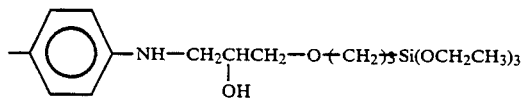

Example 3

To 6 epoxy gram equivalent of polyoxypropylene endblocked with glycidyl groups having an average polymerization degree of 50, molecular weight of about 3000 and viscosity at 25° C. of 970 cSt, were added in a reactor 4 moles of

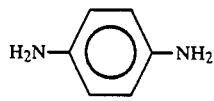

and 10% to the polyoxypropylene of methanol. The reaction was started by stirring and heating at 60° C. in a nitrogen atmosphere. The reactor content was sampled at 4 hour intervals for conducting a quantitative determination of the total amount of epoxy groups and primary amines in the specimen by using potentiometric titration, for NMR observation of the peak of epoxide methylene and for measurement of the viscosity at 25° C. After 16 hours from the start of stirring under heating, nearly theoretical amounts of the epoxy groups and primary amines were consumed and, at the same time, the proton peak of the epoxide methylene disappeared. Further, the viscosity which had been 400 cSt before starting the stirring under heating reached 5,200 cSt. Subsequently, 2.2 moles of

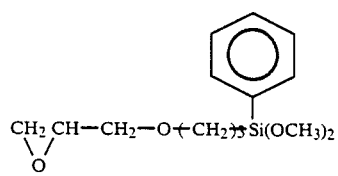

were added and heating with stirring was continued under the same conditions. The reactor content was again sampled at 4 hour intervals after adding the silane, and the total amount of epoxy groups and primary amines in the specimen was quantitatively determined by using the potentiometric titration. Further, the proton peak of the epoxide methylene was observed by NMR. Both the epoxy groups and the primary amines were substantially consumed 12 hours after the addition of silane. The reaction was stopped and methanol was stripped off to obtain a pale yellow viscous liquid polyether having a viscosity at 25° C. of 25,000 cSt, specific gravity at that temperature of 1.01 and the number average molecular weight measured by GPC of 9,500. This polyether, P-3, is end-blocked with hydrolyzable silyl groups represented by the following formula.

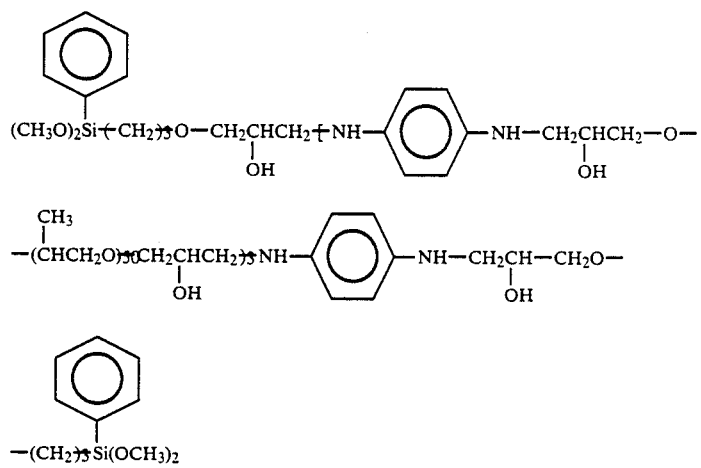

Examples 4–6

To 100 parts of polyethers (P-1 through -3) end-blocked with hydrolyzable silyl groups prepared in Examples 1 through 3, were added fillers, inorganic pigments and thixotropy agents shown in Table 1. The ingredients were well dispersed by a three roll mill. Organo tin compounds shown in Table 1 were then added and mixed with the composition to give the samples 1 through 3. These samples were cured at room temperature for 14 days to form 2 mm thick sheets. The sheets were cut into the shape of dumb bell No 2 defined in JIS K 6301. The surface cure state was observed by finger touch, and tensile test was applied. The result was designated as initial state. Then, dumb bell-like specimens obtained in the same manner were placed in a 150° C. oven, a weatherometer, and, after subjecting to aging conditions (heating or UV irradiation) for periods shown in Table 1, the aged specimens were tested as above. The results are shown in Table 1.

Comparative Example 1

To 100 parts of polyoxypropylene end-blocked with the group:

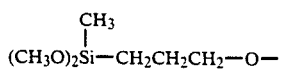

having a molecular weight of about 8,000, were added fillers, inorganic pigments and thixotropy agents shown in Table 1. The ingredients were well dispersed by a three roll mill. Organo tin compounds shown in Table 1 were then added and mixed with the composition to give the sample 4. The sample 4 was tested in the same manner as described in Examples 4 through 6. The results are shown in Table 1.

Examples 7–9

Specimens for shear resistance test shown in FIG. 1 were prepared by curing the samples 1 through 3 prepared in Examples 4 through 6 for 28 days at room temperature. Shear resistance was measured by a method similar to that of JIS K 6850. The results are shown in Table 2.

Comparative Example 2

Shear resistance was measured for sample 4 prepared in Comparative Example 1 by the same manner as described in Examples 7 through 9. The results are shown in Table 2.

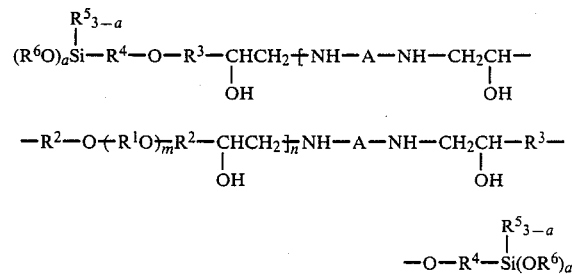

where $R^1$, $R^2$, $R^3$ and $R^4$ individually represent a divalent hydrocarbon group, $R^5$ represents a monovalent hydrocarbon group, $R^6$ represents an alkyl group with 1 to 6 carbon atoms, A represents a substituted or non-substituted divalent aromatic group, a represents a number of 1 to 3, m represents a number of 10 to 500 and n represents a number of 1 or greater.

2. A polyether as defined in claim 1, wherein $R^1$ is an ethylene and/or propylene group.

TABLE 1

| | Sample No.<br>Polyether No. | Example 4<br>Sample-1<br>P-1 | Example 5<br>Sample-2<br>P-2 | Example 6<br>Sample-3<br>P-3 | Comparative<br>Example 1<br>Sample-4 |
|---|---|---|---|---|---|
| Filler<br>(parts) | Colloidal calcium carbonate treated with fatty acid | 50 | 50 | 50 | 50 |
| | Light calcium carbonate treated with fatty acid | 20 | — | 20 | 20 |
| | Heavy calcium carbonate | 30 | 50 | 30 | 30 |
| Pigment<br>(parts) | Titanium oxide | 10 | 10 | 10 | 10 |
| | Carbon black | 0.25 | 0.25 | 0.25 | 0.25 |
| Thixotropy agent:<br>(parts) | Hydrogenated castor oil | 2 | 2 | 2 | 2 |
| Organo tin<br>compound<br>(parts) | Dibutyl tin oxide | 1 | — | 1 | 1 |
| | Dibutyl tin dilaurate | — | 1 | — | — |
| Initial<br>state | Absence or presence of surface tackiness | N | N | N | Y |
| | Hardness | 25 | 34 | 20 | 16 |
| | Tensile strength kgf/cm$^2$ | 27 | 23 | 21 | 16 |
| | Elongation % | 500 | 390 | 570 | 630 |
| 150° C.<br>heating<br>after<br>7 days | Aged State | no abnormality | no abnormality | no abnormality | notably brittle due to depolymerization |
| | Hardness | 22 | 31 | 22 | Impossible to measure |
| | Tensile strength kgf/cm$^2$ | 24 | 20 | 23 | |
| | Elongation | 510 | 370 | 590 | |
| UV ray<br>irradi-<br>ation,<br>after<br>3,000 hrs. | Aged state | no abnormality | no abnormality | no abnormality | cracking resulted |
| | Hardness | 24 | 35 | 23 | 6 |
| | Tensile strength kgf/cm$^2$ | 22 | 23 | 24 | 3 |
| | Elongation % | 490 | 350 | 570 | 170 |

TABLE 2

| Sample No. | | | Example 7<br>Sample-1 | Example 8<br>Sample-2 | Example 9<br>Sample-3 | Comparative Example 2<br>Sample-4 |
|---|---|---|---|---|---|---|
| Glass | Shear resistance | kgf/cm$^2$ | 13 | 9 | 10 | 3 |
| | Cohesive failure rate | % | 100 | 100 | 100 | 0 |
| Aluminum | Shear resistance | kgf/cm$^2$ | 12 | 11 | 10 | 3 |
| | Cohesive failure rate | % | 100 | 100 | 100 | 0 |
| Polyvinyl chloride-coated steel plate | Shear resistance | kgf/cm$^2$ | 12 | 10 | 9 | 2 |
| | Cohesive failure rate | % | 100 | 100 | 100 | 0 |

What is claimed is:

1. A polyether having molecular weight from 500 to 50,000, end-blocked with hydrolyzable silyl groups and represented by the general formula:

3. A polyether as defined in claim 1, wherein $R^1$ is a propylene group.

4. A polyether as defined in claim 1, wherein $R^2$ is a methylene group.

5. A polyether as defined in claim 1, wherein $R^6$ is a methyl group or ethyl group.

6. A polyether as defined in claim 1, wherein A represents a substituted or non-substituted phenylene group, biphenylene group or a divalent aromatic group represented by the general formula:

$$-R^7-Q-R^8-$$

where $R^7$ and $R^8$ individually represent a substituted or nonsubstituted phenylene group, Q represents an alkylene group, $-O-$, $-S-$, $-SO_2-$ or $-CO-$.

7. A polyether as defined in claim 1, wherein a is 2.